Aug. 5, 1924.

J. R. WOODALL
WAGON BRAKE
Filed April 1, 1924

J. R. Woodall,
Inventor

By Clarence A. O'Brien
Attorney

Aug. 5, 1924.

J. R. WOODALL 1,503,933

WAGON BRAKE

Filed April 1, 1924    2 Sheets-Sheet 2

J. R. Woodall,
Inventor

By Clarence A. O'Brien
Attorney

Patented Aug. 5, 1924.

1,503,933

UNITED STATES PATENT OFFICE.

JOHN R. WOODALL, OF CHAVIES, ALABAMA.

WAGON BRAKE.

Application filed April 1, 1924. Serial No. 703,425.

*To all whom it may concern:*

Be it known that I, JOHN R. WOODALL, a citizen of the United States, residing at Chavies, in the county of Dekalb and State of Alabama, have invented certain new and useful Improvements in Wagon Brakes, of which the following is a specification.

This invention relates generally to brakes and has more particular reference to a brake structure particularly adapted for application to wagons, the primary object of the invention residing in the provision of a pair of brake structures adapted for application to the rear supporting wheels of the wagon and to be so associated with each other as to be controlled by a single operating member.

An additional object of the invention is to provide a brake mechanism for wagons that may be manufactured and installed upon practically all types of wagons and wherein the brake structures upon the opposite rear wheels will provide a strengthening and supporting means for said wheels.

An additional object is to provide a wagon brake structure wherein the different elements thereof may be readily disassembled for repair or renewal purposes and wherein the connecting means between the pair of brake structures is such as to allow the present brake to be installed upon wagons of various widths.

With the foregoing and other objects in view as the nature of the invention will be better understood, the same comprises the novel form, combination and arrangement of parts hereinafter more fully described, shown in the accompanying drawings and claimed.

In the drawings wherein like reference characters indicate corresponding parts throughout the several views.

Figure 1:
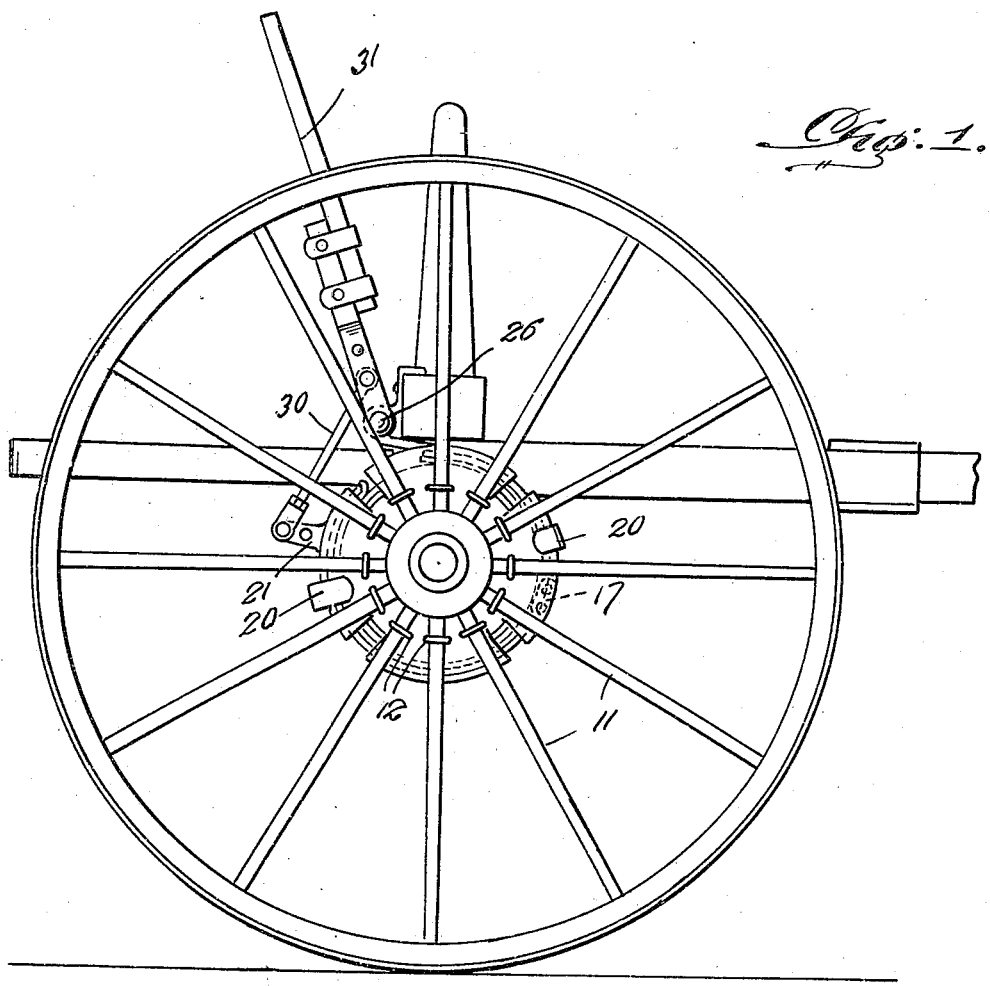
Figure 1 is an enlarged side elevational view of a wagon wheel, together with a part of the frame structure, said wagon wheel being equipped with one of the brake units constructed in accordance with the present invention.
Figure 4:
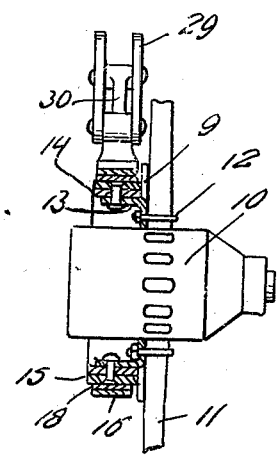
Figure 4 is a detailed vertical sectional view of said brake unit taken substantially upon the line 4—4 of Figure 3.

Now having particular reference to the drawings, 5 designates generally the wagon frame that includes a rear axle 6 upon the opposite ends of which are rotatably disposed the usual supporting wheels 7 and 8. My present brake mechanism constitutes the provision of a pair of brake units one of which is associated with each of the supporting wheels 7 and 8. These brake units are substantially identical in construction and a description of one will therefore suffice for both.

Each of these brake units constitutes the provision of a circular shaped metallic plate 9 that is equipped with a central circular opening for engagement over the hub 10 of the respective wagon wheel. Said circular shaped plate 9 is secured to the spokes 11 of the wagon wheel through the medium of U-bolts 12 and in this instance it will be readily apparent that this plate 9 constitutes a substantial strengthening means for the wheel to which it is attached. Said plate 9 is formed with a plurality of struck-out inwardly extending ears 13 to which is riveted a circular shaped metallic band 14 upon the outer side of which is a band of friction material 15, the bands 14 and 15 being rigidly secured to the ears 13 of the plate 9 through the medium of rivets or other suitable fastening means.

Disposed around the band 15 of friction material is a two part brake band, the sections 16—16 of which are pivotally secured together at 17, Figure 3, and upon the inner side of which is a brake band lining 18 that grips the friction band 15 when the sections of the brake band are drawn together in a manner hereinafter more fully described.

The plate 9 attached to the spokes of the wheel is of greater width than the combined diameters of the different bands in order to prevent the sectional brake band, as well as its lining, from moving outwardly into engagement with the spokes of the wheel. Secured to the under side of the axle 6 at a point adjacent the inner end of the wheel hub, is a metallic strap 19, the ends of which are so twisted as to provide plane surfaces for engagement with the inner edges of the different brake bands for preventing the disengagement of the sectional band from the wheel hub carrying band. The extreme ends of this strap 19 are bent over upon the outer side of the plate 9 as indicated at 20—20 in Figure 1 for serving as an additional securing means for said strap.

One section 16 of the two-part brake band is equipped at its free end with a laterally extending arm 21, while the adjacent end of the outer brake band section is equipped with a tangentially arranged arm 22, the end of which is provided with a bearing 23.

Figure 2:
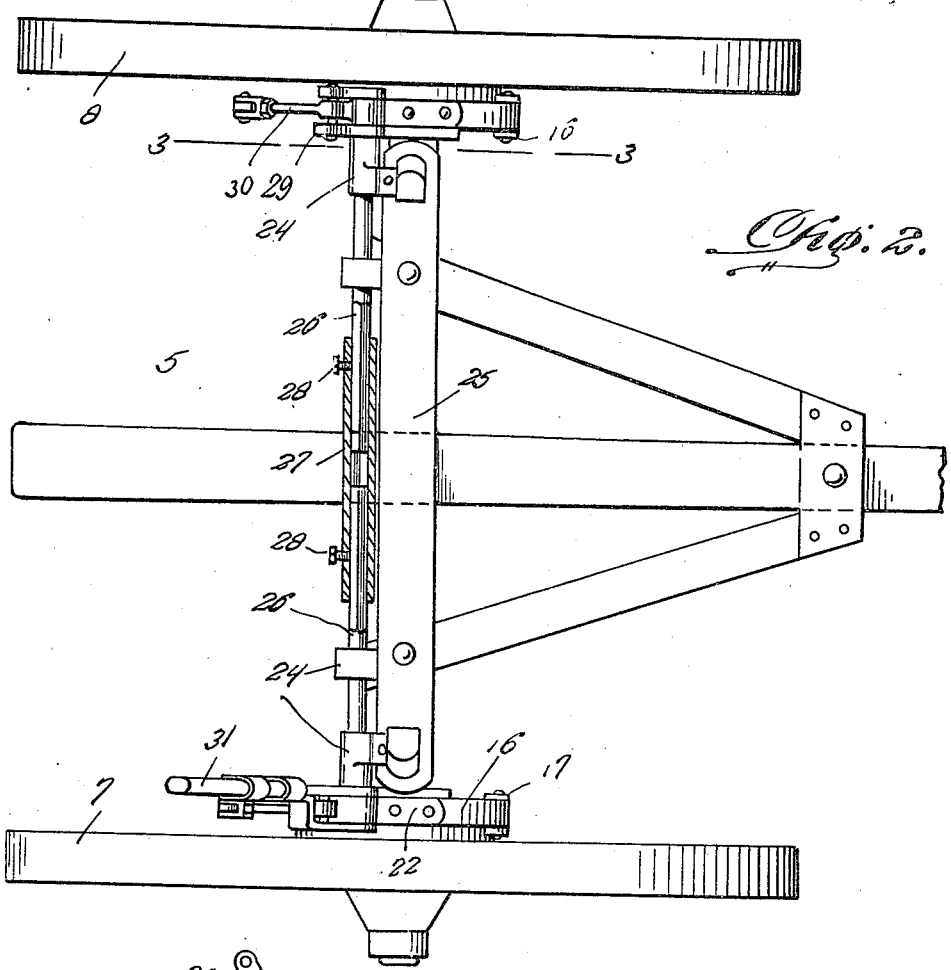
Figure 2 is a top plan view of the rear end of the wagon frame structure, the rear supporting wheels thereof being equipped with brake units constructed in accordance with the present invention, a portion of the interconnecting structure between the brake control means of the brake units being shown in cross section.

Journalled within suitable bearings 24 carried by the wagon bolster 25 is a pair of spaced longitudinally extending shafts 26—26, the adjacent ends of which are squared as clearly shown in Figure 2 for extension within the opposite end of a tube 27 that is square in cross section. These squared ends of the shafts are rigidly secured within the tube 27, through the medium of set screws 28—28.

Figure 3:
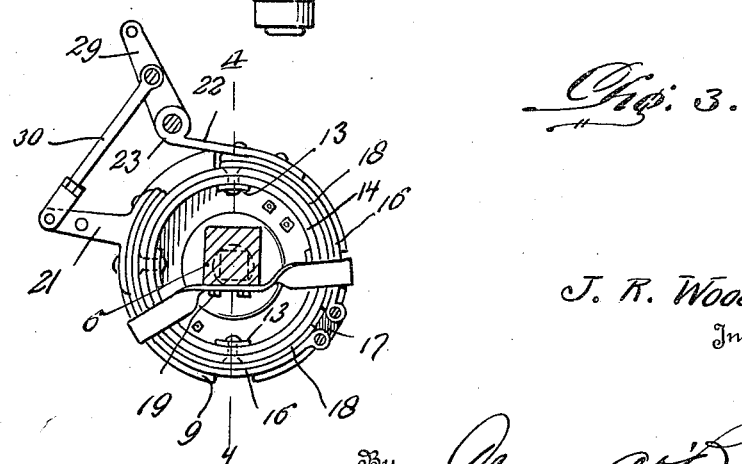
Figure 3 is a detailed longitudinal sectional view taken substantially upon the line 3—3 of Figure 2, for disclosing in side elevation one of the brake units.

The outer ends of the shafts 26—26 are disposed within the bearings 23 of the tangentially arranged arms 22 of the hereinbefore described brake band sections and keyed to these ends of the shafts adjacent each brake unit are laterally extending arms 29 that have operative connection with the arms 21 of the remaining brake shoe section as clearly shown in Figure 3 through the medium of rods 30.

The arm 29 adjacent the right hand side of the wagon structure is equipped with an upwardly extending hand lever 31 and it will be manifest from the foregoing that when the hand lever 31 is moved in a forward direction, the brake band sections of the units that carry the arms 21 will be moved toward the other sections of said brake bands for manifestly breaking the rotation of the wheel carrying members of the brake units. It will also be obvious that an actuation of the brake band structure of one unit through the medium of the lever 31 will be imparted to the similar members of the other brake units upon the other wagon wheel for braking the rotation of this other wheel.

The specific operation, together with numerous advantages of a wagon brake of this character, will be at once appreciated by those skilled in the art and even though I have herein shown and described the most practical embodiments of the invention with which I am at this time familiar, it is nevertheless to be understood that minor changes may be made in the invention without departing from the spirit and scope of the appended claims.

Having thus described my invention, what I claim as new and desire to secure by Letters Patent is:

1. In a wagon brake of the character described, a pair of brake units adapted for association with a pair of the wagon wheels, each unit including a wheel attachment member, a band carried by said attachment member, a brake band including a pair of pivotally connected sections disposed upon said attachment carrying band, arms connected to the adjacent free ends of the band sections, a sectional horizontal shaft journalled in bearings carried by the wagon frame and at their outer ends within certain of the band section arms, means for adjustably connecting said shaft sections together, lateral arms connected to the outer ends of the shaft sections, connections between said arms and the before mentioned arms of the other brake sections, and a hand lever connected to one of the arms of the shaft sections.

2. In a wagon brake of the character described, a pair of brake units adapted for association with a pair of wagon wheels, each unit including a wheel attachment member, a band carried by said attachment member, a brake band including a pair of pivotally connected sections disposed upon said attachment carrying band, arms connected to the adjacent free ends of the band sections, a rigid connection for one of the arms of the band sections, a lateral arm pivoted to the rigidly connected band section arm, a connection between said arm and the aforementioned arm of the other brake band section, a hand lever connected to said lateral arm, and means for simultaneously actuating one brake unit when the lever of the other brake unit is operated.

In testimony whereof I affix my signature.

JOHN R. WOODALL.